May 19, 1970     J. F. BRUCE-SANDERS     3,512,706
ELECTRONIC TAXIMETER

Filed July 15, 1968     7 Sheets-Sheet 1

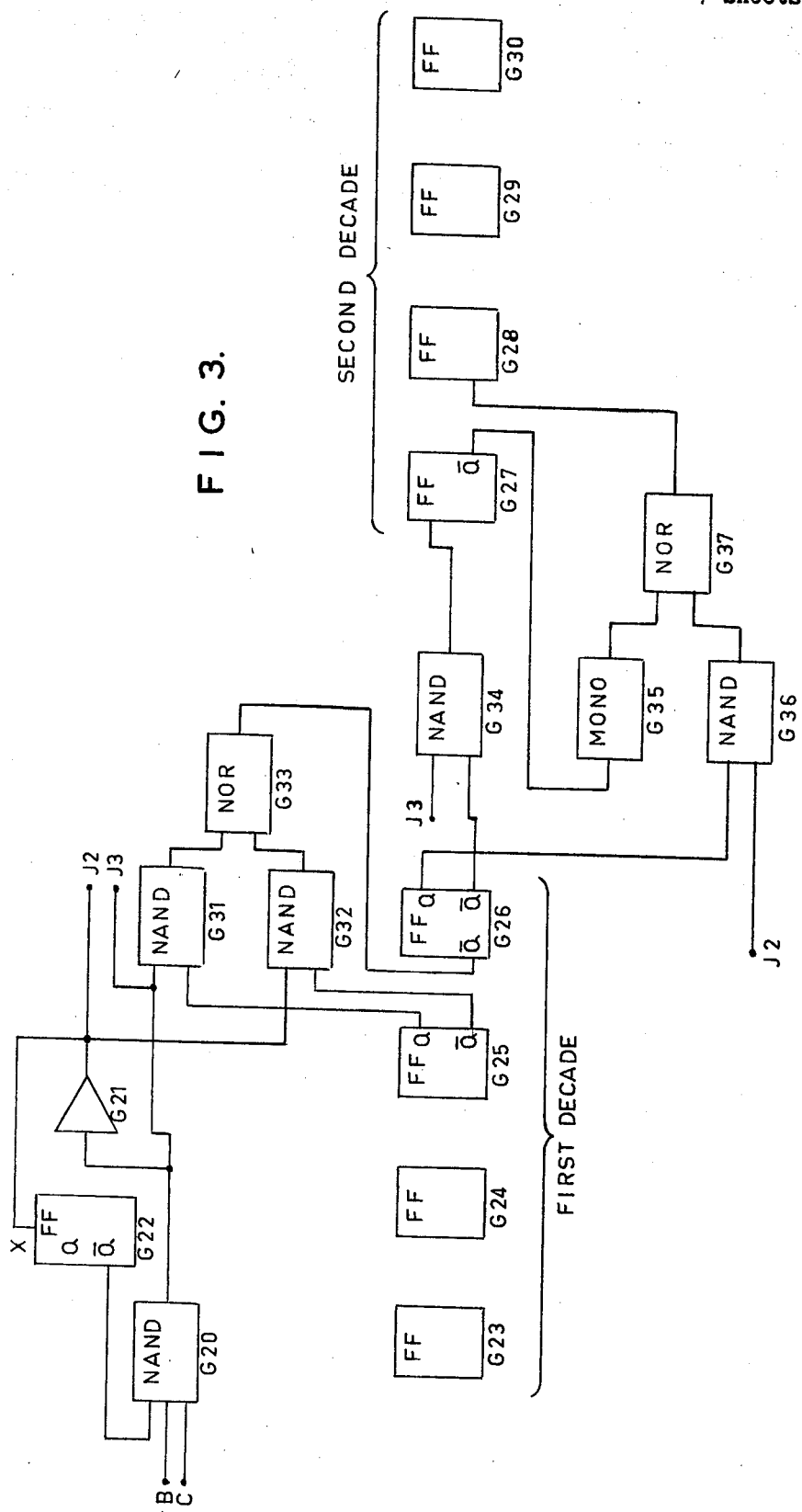

United States Patent Office 3,512,706
Patented May 19, 1970

---

3,512,706
ELECTRONIC TAXIMETER
James Frederick Bruce-Sanders, Springfield St., Upper
Mt. Gravatt, Brisbane, Queensland, Australia
Filed July 15, 1968, Ser. No. 745,021
Claims priority, application Australia, July 14, 1967,
24,615/67; Dec. 20, 1967, 31,494/67
Int. Cl. G07b 13/00
U.S. Cl. 235—30
16 Claims

ABSTRACT OF THE DISCLOSURE

An electronic taxi-meter reading a distance charge and a waiting charge includes speedometer sensor means giving pulses representing distance charge in a certain proportion, constant-frequency oscillator means giving pulses representing waiting charge in the same proportion, counting means summing to total of said pulses, and control means actuated by said sensor means to prevent application of waiting pulses to said counting means.

Flag-fall fare or radio-hire-charge fare may be added as pulses to said counting means. A master-counter summing charges over one shift or one day, and a speedometer-error-correction circuit may be provided.

---

This invention relates to taxi-meters.

Prior taxi-meters using complex mechanical arrangements have been used to measure and add mileage fare, waiting time fare and "flag-fall" (i.e. the set fixed charge on hiring) and to give a visual display of the total for any one hire trip on a mechanical counter.

The taxi-meter of this invention proposes the use of electronic and electrical circuitry for the same general purposes. Various meter functions are performed better and more accurately by the present meter, and certain new functions can be performed not attainable at all with prior mechanical meters, as will be pointed out below.

It is an object of the invention to provide a meter in which mileage and waiting time are each represented by a train of electrical pulses, the "waiting time" pulses being inhibited by the presence of "mileage" pulses, so that the waiting time record begins whenever the vehicle stops during a hire period with no delay. This contrasts with prior mechanical meters in which there is a "drop out" time between "mileage" and "waiting time" of from 4 to 7 seconds.

The invention lends itself also to the following additional features:

(a) Storage and read-out on demand of the total fares over a given period, such as one shift or one day. This is a result not achieved by any prior meter.

(b) A much simpler and more easily installed speedometer sensor, than that in prior use.

(c) Electronic compensation for mileage inaccuracies due to tyre wear.

(d) Automatic recording of extra charge for radio hire, a result not attainable in any other meter.

In addition the present meter, by using solid state and micro-electronic logic units, may be made small, easily installed and removed, and reliable, with no wear in the computing sections.

The apparatus may easily be changed from one charging rate to another, by insertion of alternative circuit boards or change of connections. Readout may be by large easily-seen numerals. No flag is necessary; all functions may be controlled by a three-way switch with "off," "distance only" and "normal hire" positions, indication being by coloured lights.

The invention basically comprises a taximeter including; a sensor to produce a first electrical pulse-train, the number of pulses being proportional to the mileage travelled; an oscillator to produce a constant-frequency second pulse-train; a first frequency divider for said first train, with output representing mileage fare; a second frequency divider for said second train, with output representing waiting-time fare; a counter counting the sum of the number of pulses from said first and second dividers; a digital visual fare read-out from said counter; and control means actuated by the presence of said first pulse-train to inhibit pulse output from said second divider.

The counter, and therefore the read-out, may be reduced to zero by switching the meter to "off" at the termination of each trip.

A second or master counter may be provided which is not so zeroed, and continues to count the total of fares taken. On actuation of a total-fare switch, the total fares for the preceding period may be displayed on the read-out, without destroying the contents of the master counter, this counter only being zeroed by operation of a switch operated by a master key.

Various other aspects of the taxi-meter of this invention will become apparent from the description of exemplary embodiments illustrated in the accompanying drawings, in which:

FIG. 3 is a block diagram of a circuit for entry of flag fall charges,

GENERAL DESCRIPTION

Figure 2:
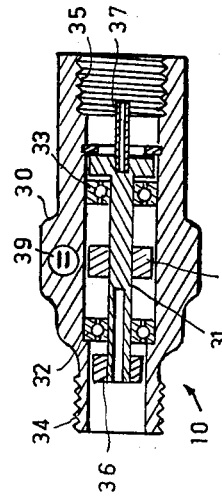
FIG. 2 represents in section the sensor 10 of FIG. 1.
Figure 1:
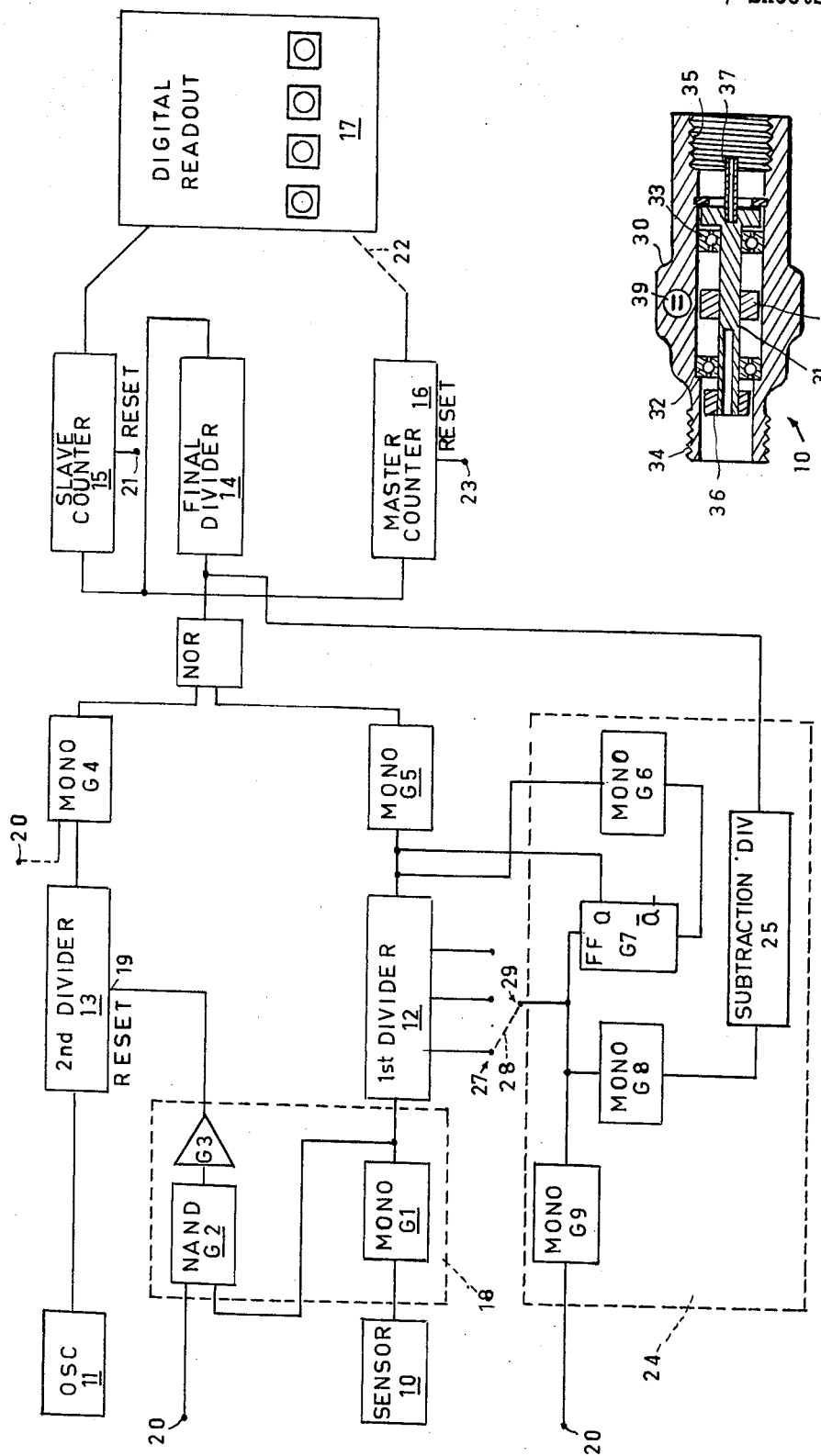
FIG. 1 represents a general block circuit diagram of the taxi-meter.

Referring first to FIGS. 1 and 2, a sensor 10 actuated from the taxi speedometer cable gives a first train of pulses, the number of pulses being proportional to the revolutions of the cable and therefore to the mileage travelled. This pulse train will be referred to as the "mileage pulse train."

The details of sensor 10 are shown in FIG. 2. In a hollow body 30, a shaft 31 is mounted for rotation in ball races 32, 33. External thread 34 is provided for coupling to the normal speedometer cable and internal thread 35 to the normal speedometer, shaft 31 having couplings 36, 37 on its ends to engage the standard fittings on the cable and the speedometer respectively. Sensor 10 may therefore be interposed in the existing speedometer assembly very easily.

Shaft 31 carries a magnetic armature 38 (shown as a two pole armature) and a reed relay 39 is fixed within body 30 near armature 38.

Armature 38 rotates with shaft 31 and for each revolution closes the contacts of relay 39 twice (once for each pole of the armature). One lead of relay 39 is connected to a suitable voltage and the other to the input of monostable circuit G1 (FIG. 1), so that mono G1 is pulsed twice for each revolution of shaft 31. Armature 38 may clearly have a single pole or more than two.

An oscillator 11 produces a constant-frequency second pulse train, to be referred to as the "time pulse train."

Ignoring certain elements in the circuit for the moment, the mileage pulse train is passed to a first frequency-divider 12 and the time pulse train to a second divider 13. The division ratios of the first and second dividers are such that the pulses issuing from them are proportional respectively to the "mileage fare" and the "waiting-time fare" applicable to the particular local conditions, and are compatible with one another, i.e. each pulse whether from divider 12 or divider 13, represents the same amount of fare.

Example

Assuming waiting time rates are 3 cents per minute and distance rates are 3 cents per ⅕ mile and sensor 10 gives 2000 pulses per mile. Then with divider 13 set at a division of 8 and oscillator 11 pulsing every 375 milliseconds, an output pulse from 13 occurs every 3 seconds and each pulse represents 3/20 cent.

To make divider 12 compatible, its division ratio must be such as to give one pulse for each 1/100 mile (corresponding to 3/20 cent also). Thus the ratio of divider 12 is 20.

Final divider 14 (see below) may be now set at a ratio of 20 and each pulse from 14 will then represent 3 cents.

By making oscillator 11 and dividers 12, 13, 14 replaceable or plug-in units, the meter can very quickly be changed to suit other rates.

The outputs of both dividers 12 and 13 are passed to a final divider 14 which sums their outputs.

The output of divider 14 is fed in parallel to slave counter 15 and master counter 16. The count in counter 15 is normally displayed on a visual digital read-out 17, which thus gives the total trip fare at any time. (The "flag-fall" amount may be separately added into the counters, as will later be explained.)

It will be appreciated that while the time pulse train from oscillator 11 is supplied to the counters, "waiting time" is being charged, and such "waiting time" charge has to cease whenever the vehicle is moving. For this purpose, a control means and isolator 18 is provided. Whenever the vehicle is moving, pulses of the mileage pulse train are produced by sensor 10. To prevent difficulties arising in the case where the sensor 10 stops on the mark period of a pulse, a monostable circuit G1 is provided at the output of sensor 10. The output of mono G1 is taken to one input of a NAND gate circuit G2, the output of which goes through an inverting gate G3 to the reset terminal 19 of divider 13. The second input of gate G2 goes to a terminal 20 which gives a logical "1" signal with the main switch of the meter in "normal hire" position, but a logical "0" in the "distance only" position.

Alternatively, the terminal 20 may connect to a second input of mono G4 in the output of divider 13, as shown dotted.

In either case, with the switch in "hire" position, any mileage pulses will continually reset divider 13 and no waiting time will be recorded. If mileage pulses cease (i.e. the vehicle stops) no reset is applied to divider 13 and waiting time is recorded until the vehicle starts again.

With the switch in "distance only" position, however, divider 13 will give no output whether mileage pulses are present or not. No waiting time will then be recorded, even when the vehicle is stopped.

The appropriate trip fare will therefore appear on read-out 17 according to the conditions set by the main switch. At the beginning of a subsequent hire, return of the main switch from "off" to the middle "distance only" position activates the reset 21 of counter 15 to return it and read-out 17 to zero ready to record the new fare. At the same time dividers 12 and 14 are zeroed.

Master counter 16, however, is not reset at this time and continues to sum successive fares until, say, the end of a driving shift. At any time, a switch operable from the control console may be operated, connecting counter 16 via lead 22 to read-out 17 and displaying thereon the total of fares to this time, but preserving the contents of counter 16. A special key switch is provided which connects reset line 23 and zeroes counter 16 and read-out 17 ready for the first hire in the next shift.

POWER SUPPLY

It will be seen that the counters are vulnerable to power failure. If the power fails all readings will return to zero and the count will be lost.

For this reason the meter has its own power supply consisting preferably of a bank of three nickel-cadmium batteries. These are connected to the meter and also through a reversed rectifier to the vehicle supply. If the vehicle supply fails, power is maintained by the Ni-Cd batteries which cannot discharge through the vehicle supply because of the rectifier. The Ci-Cd batteries are recharged as necessary by the vehicle supply through the rectifier.

A useful fault indication may be obtained by wiring the read-out through a small dropping resistor from the 12 volt supply. If a fault develops in the drive system, such as a breakdown of the gate diodes, the increased current in the read-out drops the voltage to such an extent that all read-out lights are dimmed or extinguished.

SPEEDOMETER ERROR CORRECTION

Since the speedometer is dependent for mileage accuracy on the vehicle wheel diameter, readings of up to 5% too high can occur with tyre wear.

The subtractor unit 24 of FIG. 1 may compensate for such errors.

Divider 12 is provided with terminals 27 which when pulsed will set in a preset number of pulses to the count. Selected terminals 27 receive negative pulses (via links such as 28) from a terminal 29 in the subtractor unit 24. The inputs at 27 are arranged to give zero output to monostable G5 from divider 12.

The subtractor unit 24 includes a subtraction divider 25 which is pulsed from the input of final divider 14. Its division ratio is usually the same as that of divider 14 and in any case is such that it produces an output pulse at the end of a preselected distance (such as ⅕ mile).

This pulse is applied to monostable G8 and thence as a negative pulse to terminal 29 and to whichever terminals 27 are bridged to 29. The pulse on terminals 27 will set counter 12 back by a preselected number and it will need this same number of input pulses from G1 to restore counter 12 to its original count.

The pulse on 29 will at the same time trigger flip-flop G7 so that the Q output goes low and monostable G5 is disabled, and no pulse is passed to final divider 14 or subtraction divider 25. The next output pulse from 12 again reverses the flip-flop G7 via monostable G6 and enables monostable G5 again.

Therefore, supposing terminals 29–27 are bridged to subtract 4 pulses, at the end of each ⅕ mile four pulses will be subtracted. This, if the pulse rate from the sensor 10 is a nominal 2000 per mile, will give a speedometer correction of 1%.

It is also necessary to introduce the correction on the first ⅕ mile of the hire period. For this purpose, monostable G9 is pulsed from terminal 20 on switching the meter to "hire" and a subtraction pulse is passed to divider 12 as before.

FLAG FALL CHARGING

As previously explained, the read-out and counter 15 is zeroed on movement of the meter switch to "off" position. However, before a new hire can be started, the amount of the initial charge (the "flag-fall") has to be entered. This is done by applying control pulses to the first and second decades of counters 15 and 16 when the main switch passes from the "distance only" to the lower or "hire" position.

FIG. 3 shows the block circuit for entry of a 15 cent flag-fall as an example.

Broadly speaking, pulses are produced at J2 and J3 on movement of the main switch to "hire" position and these pulses act on the first decade (G23 through G26)

and the second decade (G27 through G30) of the master counter 16 (FIG. 1) to add 15 cents to the total.

On operation of the main switch to "hire," terminal B goes high. As the normal condition of the Q output of flip-flop G22 is high also, NAND gate G20 produces a low pulse at J3 as soon as terminal C goes high which through inverter G21 produces a high pulse at J2. Terminal C is fed by the pulse output of oscillator 11 (FIG. 1) and therefore goes high once each 375 milliseconds and gates G20 against noise. Pulse J2 is applied to reset X of G22 and changes it over to give low output from $\bar{Q}$.

This disables NAND gate G20, so that it is not possible to enter a second "flag-fall" amount until the main switch is returned to "off" and again to "hire," thus restoring the high output at $\bar{Q}$ of G22. Multiple "flag-falls" on the one hiring are prevented.

First decade G23–G26 is biquinary, that is G23, G24 and G25 count to "4" with G26 either at 0 or 1 to indicate an additional count of "0" or "5."

Since the master counter stores a running total, the addition of 5 cents to the first decade may produce a carry to the second decade or may not. If the first decade is reading 4 or less, G26 will be at "0" and no carry results. If the reading is 5 or more, G26 will be at "1" and a carry to the second decade is necessary.

However, since "15" is to be entered (not 5), the second decade will have a 1 entered apart from any carry, and, if these two entries are simultaneous, an error of 10 cents in the total can occur. To prevent this G34 and G36 sense the state of G26.

With a first decade count of 4 or less the Q output of G26 is zero, G36 is disabled and G37 enabled. On pulsing of J2, G36 remains disabled, but J3 will go low and the output of G34 will go high and then return to low on return of J3 to its quiescent state, so that the second decade stage G27 will be upclocked one pulse representing 10 cents.

At the same time, the Q and $\bar{Q}$ outputs of G25 are applied to an input of each of NAND gates G31 and G32, J3 and J2 pulses being applied respectively to the other inputs. Whatever the state of G25, NOR gate G33 is enabled, passing a pulse to G26 and upclocking 1 pulse representing 5 cents. The 15 cents flag-fall has therefore been entered correctly.

With a first decade count of 5 or more, the Q output of G26 is high and $\bar{Q}$ low, so G4 is disabled and G36 enabled. NOR gate G37 then passes a pulse to the second stage G28 of the second decade, representing 20 cents entry.

The gates G31, G32 and G33 enter 5 cents in G26 as before described.

Therefore the 15 cents have been correctly entered, allowing for the carry of 10 cents from the first to the second decade.

The monostable G35 allows the second decade to function normally during the quiescent period of the flag-fall arrangement. G35 is high dropping out to zero on change of state of G27. This negative pulse will be transmitted through G37, since the other input of G37 is high due to the J2 input on G36 returning to low.

Thus counting pulses are passed normally from G27 to G28 in these conditions.

While a 15 cent flag-fall has been described it will be clear that the circuits can be changed to allow for other flag-fall amounts.

For example a 20 cent flag-fall needs only a single pulse into the flip-flop corresponding to G28 (FIG. 3), a circuit corresponding to G35, G36 and G37 re-establishing normal counter connection between G27 and G28 after entry of the flag-fall.

RADIO CALL CHARGE

When a taxicab picks up a fare as a direct result of a radio call, the taxi is entitled to charge a fee for the radio service.

With the advent of two-way selective call radio, automatic entry of the radio charge may be made by a subassembly of the meter described.

With selective calling, the base station operator calls a specific cab in the general vicinity of the required area and enquires if the driver will accept the job. On affirmative answer, the base operator presses a button to send an "accept" tone by the radio.

Should the fare not eventuate, base is informed and will then press a second button sending a "cancel" tone.

The "accept" tone is selected by a bandpass filter and adds one digit to a counter. If the "cancel" tone is received, it is selected by a second bandpass filter and subtracts one digit from the counter.

Figure 4:
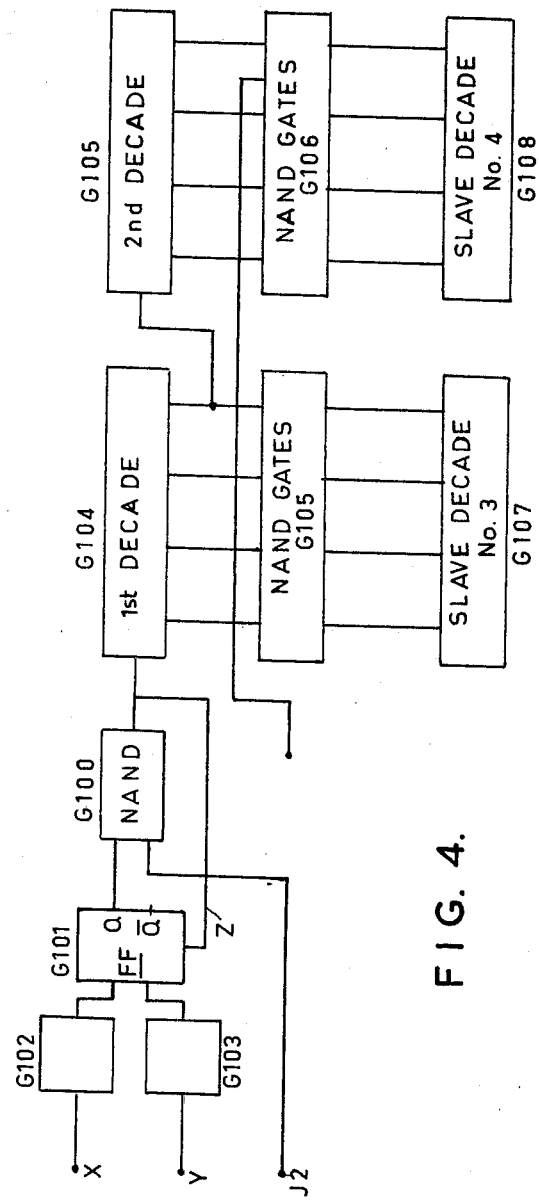
FIG. 4 is a block diagram of a circuit for entry of radio-hire calls.

FIG. 4 shows in block form a circuit for registering radio calls.

The input J2 is that described under the same designation in FIG. 3 and it will be recalled that a pulse appears at J2 when the three way switch is moved to "hire" position.

Pulse J2 is applied to one input of NAND circuit G100 the other input being from the Q output of a flip-flop G101. The inputs X and Y of G101 are fed respectively from the outputs of filters G102 and G103 respectively. Filter G102 is responsive to the "accept" tone from the radio and filter G103 to the "cancel" tone.

The output of G100 feeds the first decade of a two-decade counter G104–G105 and an output pulse from G100 up-clocks the counter one unit.

The output of G100 is also connected to the reset lead Z of G101.

The procedure so far is as follows:

When a radio call is accepted, the "accept" tone via G102 sends G101 high, i.e. the output Q is at logical 1. The driver then proceeds to pick up the passenger. If a pick-up is made, the meter is switched to "hire" position and a pulse appears at J2, the output of G100 then goes low and one unit is recorded in counter G104–G105. At the same time the G100 output at Z reverses G101 to give a zero output at Q thus setting G101 for the next "accept" tone.

If no pick up is made, the meter is not switched to "hire" and the "cancel" tone through filter G103 resets G101 without a unit being clocked up in the counter.

At the end of a shift, counter G104–G105 will record the number of effective radio hires, its capacity being 99.

The master memory, as previously explained, may display the total for the shift on read-out 17 (FIG. 1) on operation of a key switch, and this total after recordal is zeroed.

The number stored in counter G104–G105 may be now read out via NAND gate assemblies G105–G106, to the third and fourth decades G107–G108 of the slave counter and therefore into read-out 17 (FIG. 1).

Thus total takings for the shift are indicated as hire charges plus the number of effective radio calls.

Figure 5:
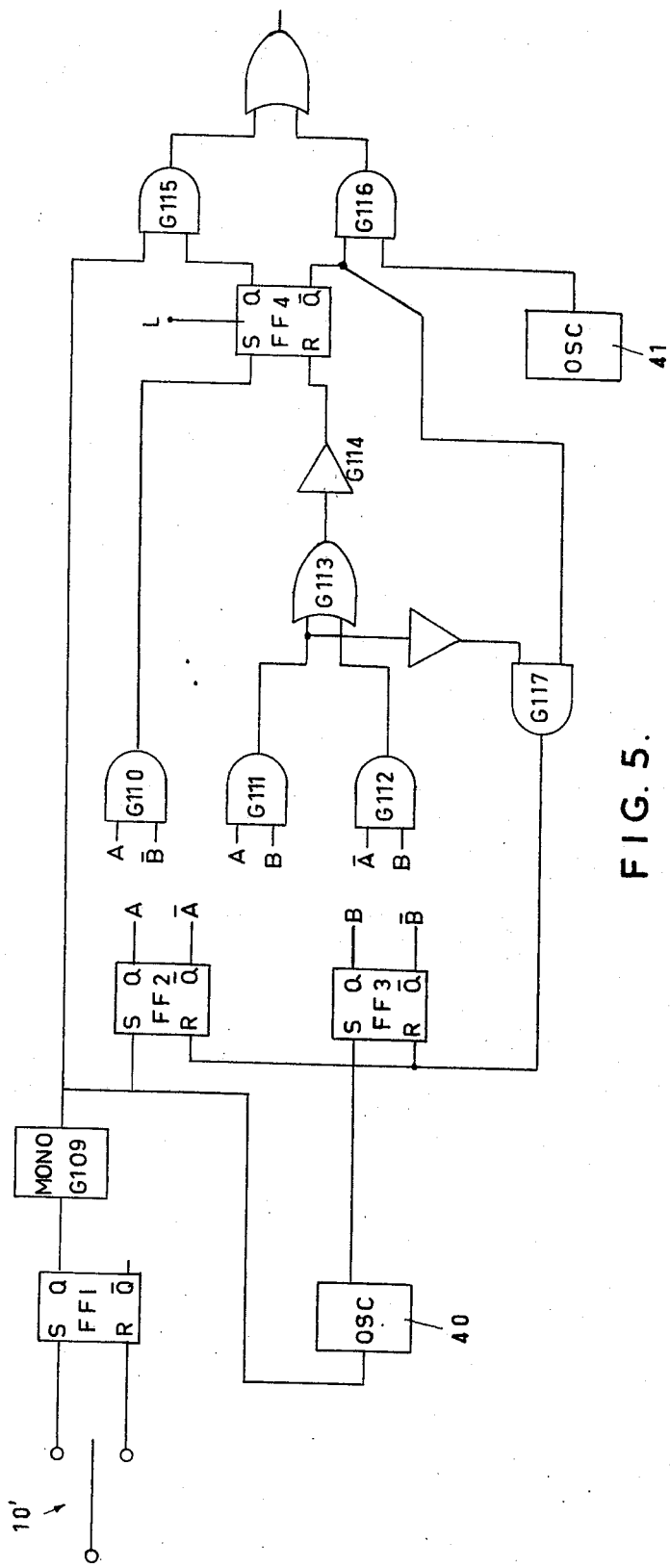
FIG. 5 is a block diagram of an alternative input system for the meter.

FIG. 5 shows a modified input system for the meter.

The sensor 10' is made with a relay of changeover type, rather than the single contact type shown at 10 in FIG. 2, the two outputs being connected to the set and reset terminals of a binary FF1.

This avoids any false count due to contact bounce, since the first contact make will set or reset FF1 and further similar "bounce" contacts will have no effect.

Mono G40 ensures that pulses are produced only on make of 10' irrespective of any indeterminate rest state of the sensor.

The circuit is designed to produce three conditions:
  (a) "Distance" information only—vehicle moving in excess of minimum speed (e.g. 12 m.p.h.).
  (b) "Distance" and "time" information—vehicle moving below minimum speed, or
  (c) "Time" information only—vehicle stationary.

Oscillator 40 is set at a repetition rate simulating the minimum speed of 12 m.p.h., so that above this speed pulses from G109 reset the oscillator each time within the cycle, and the oscillator produces no output.

The "distance" pulses from G109 and "time" pulses from 40 are applied to one input of binaries FF2 and FF3 respectively. If the outputs of FF2 and FF3 are represented by A and B respectively, the three conditions above are logically represented by:

(a) $A \cdot \overline{B}$ where "distance" information prevails,
(b) $A \cdot B$ where "time" information prevails,
(c) $\overline{A} \cdot B$ where "time" information again prevails.

Gates G110, G111 and G112 have inputs connected as indicated and therefore open respectively for conditions (a), (b) and (c). Gates G111 and G112 reset binary FF4 via G113, G114 and gate G110 directly sets binary FF4.

Therefore for condition (a), gate G115 is opened to pass pulses from mono G109 to the counter and for conditions (b) or (c) gate G116 is opened to allow "time" pulses from an oscillator 41 to reach the counter.

FF3 and FF4 are reset by NAND gate G117 fed by an inverted pulse from G111 and the reset output of G116, to provide continuous sampling in the distance-time mode.

Where the meter is to be used in "distance only" condition, distance is to be recorded, and not time, from zero speed upwards. FF4 is locked in the distance position by a voltage on lead L.

Figure 6:
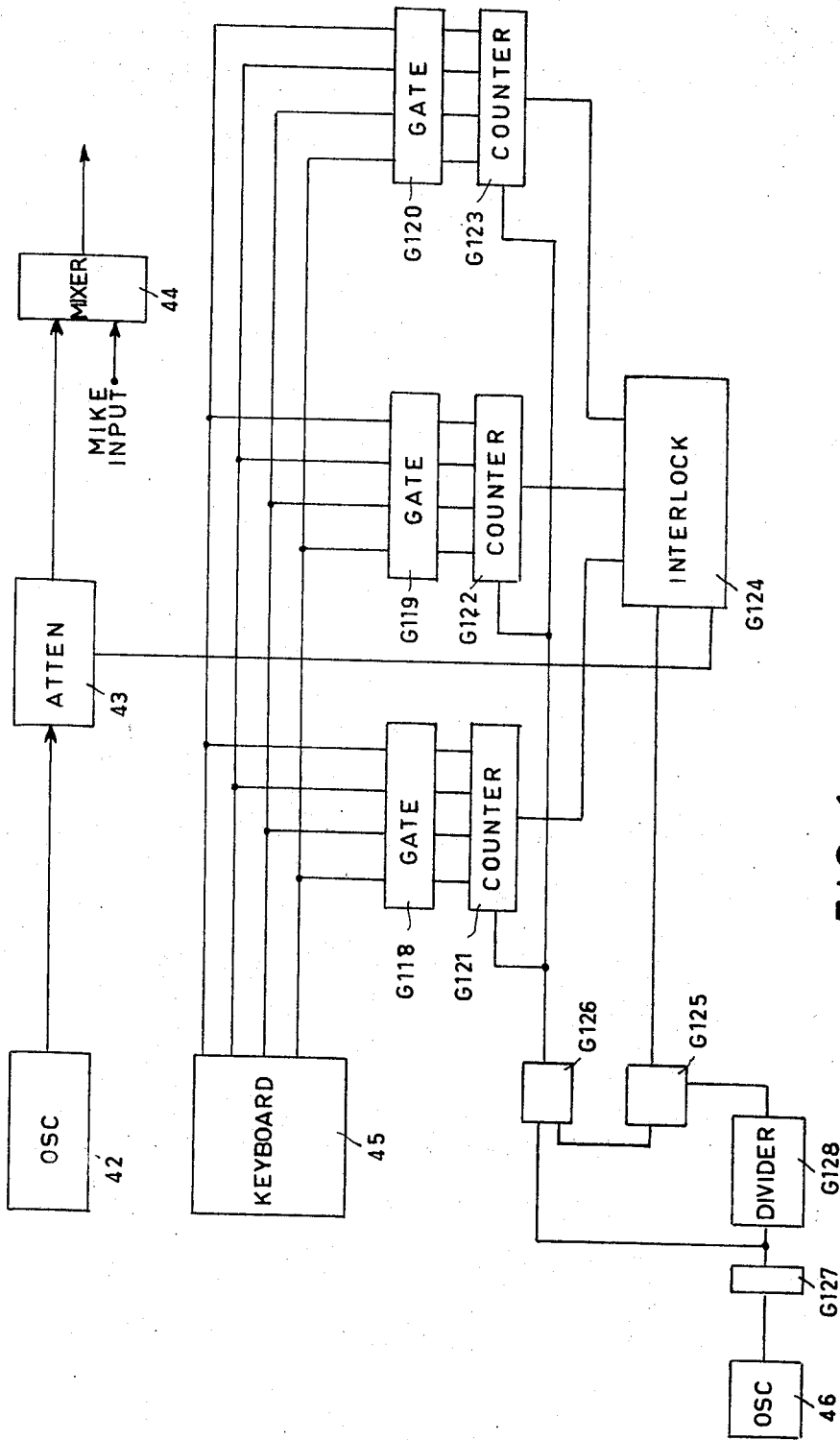
FIGS. 6 and 7 show modified radio-hire circuits, respectively for the base-station and the taxi.
Figure 7:
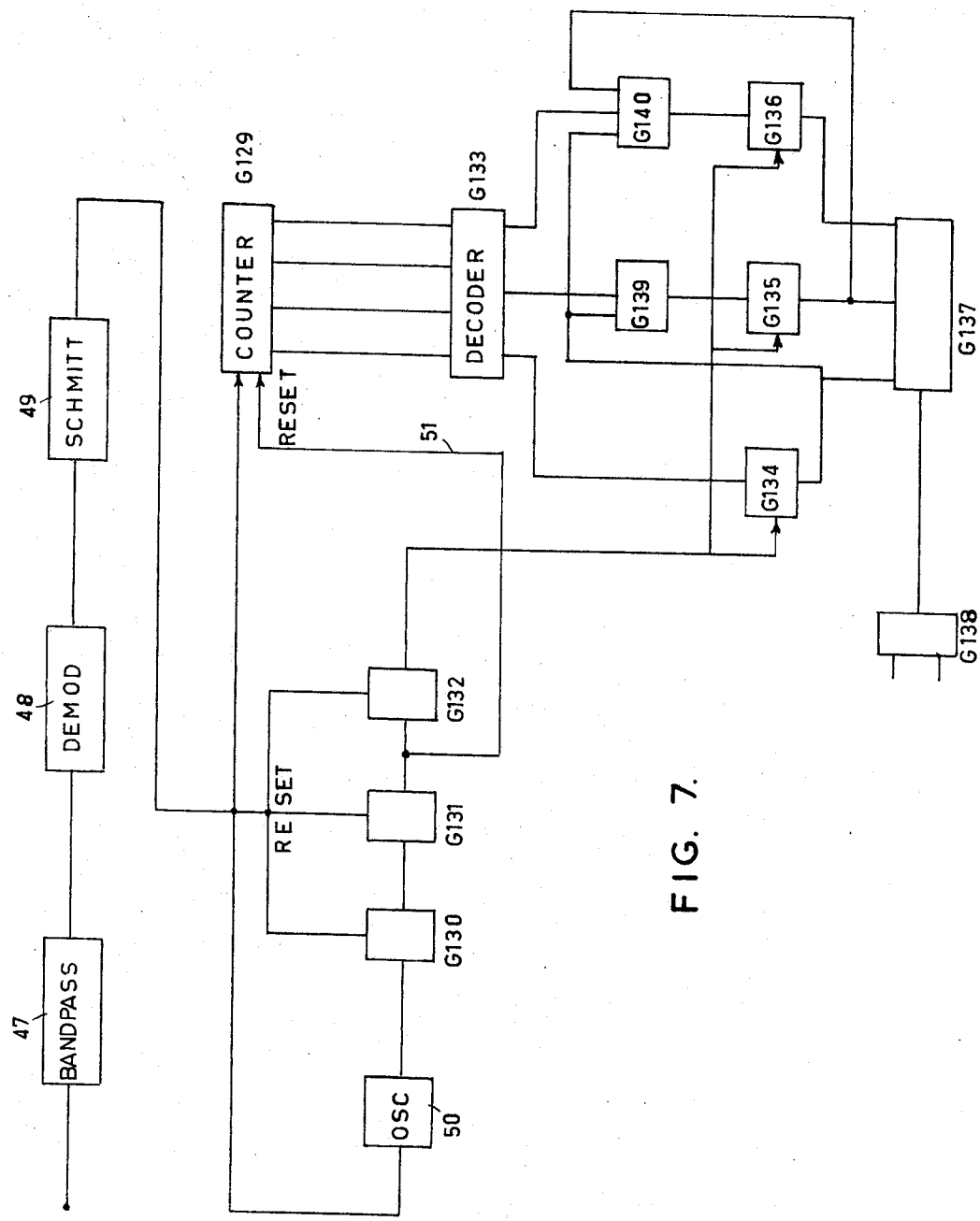

FIGS. 6 and 7 show a modified radio surcharge system, FIG. 6 being at the base station and FIG. 7 the taxi station.

This system selects the taxi by transmitting a code number corresponding to the fleet number of the taxi.

At the base station a 1 kc. oscillator 42 produces a continuous output to an attenuator 43 (which may conveniently use field-effect transistors) and thence to a mixer 44 to which microphone signals are also supplied.

The attenuator 43 is switched on and off by keyed gates to produce tone bursts representing identification numbers of the taxis. The system illustrated uses a three-digit number. Each digit is represented by the corresponding number of pulses from oscillator 42 (1 ms. on/1 ms. off), except for the digit "zero" which is represented by 15 pulses. Digits are separated by "wait periods" of 10 ms.

A keyboard 45 has one key for each digit 0–9 which are converted into 4-digit binary coded signals via gates G118–G120 which store the three successive digits in counters G121, G122 and G123.

Interlock logic circuits at G124 ensure sequential setting of the three counters.

After all three digits are entered, G124 keys attenuator 43 to transmit the first digit from counter G121, under control of oscillator 46.

When counter G121 has been counted back to zero, G124 produces a pulse to reset G125 and disable gate G126, preventing further pulses from oscillator 46 reaching the counters or attenuator 43.

Pulses from 46 are, however, applied via divider G128 (÷10) to set G125 after 10 ms. (the wait time between digits). G126 then opens and the next two digits are transmitted in sequence, in similar manner.

In the taxi (FIG. 7), the received digital signal is passed through a band-pass filter 47, demodulated at 48 and applied to a Schmitt trigger 49 for shaping. The pulses are applied to the input of a 4-binary counter G129, the resets of binaries G130, G131 and G132 and to a re-synch terminal of a 4 ms. oscillator 50.

During transmission of a digit, oscillator 50 produces no output, since there is only 1 ms. between pulses, and G130, G131 and G132 remain in off condition. At the end of the first digit, oscillator 50 pulses, opening G130 and strobing decoding gate G133.

If the digit held in counter G129 is the same as the decoding sequence associated with a first decoding gate G134, then G134 is set to give an input NAND gate G137.

At 8 ms. from the end of the first digit, oscillator 50 pulses again, G130 is switched off and G131 switched on, pulsing lead 51 to clear counter G129.

At 10 ms., the second digit begins, is set into counter G129 and is compared with the decoding sequence in a second decoding gate G135.

The third digit is similarly compared with decoding gate G136. Only if all three digits correspond to gates G134, G135 and G136 respectively is gate G137 opened and binary G138 is set. Output of G138 is used to record a "radio call" charge, as previously explained, when the flag is next dropped.

To clear the decoding gates G134 to G136, their resets are commoned to the output of binary G132 which changes state only after completion of the third digit.

As so far described, the system could respond to digits in the wrong order. For example, a signal 125 could activate decoders for 215 or 512. To prevent this, the output of G134 controls the inputs of G135 and G136 via gates G139 and G140, and the output of G135 controls the input of G136 via gate G140.

Thus, until G134 has been set, no signal can operate G135 or G136, and until G135 has been set, no signal can operate G136. The digit sequence is therefore preserved.

If no passenger is picked up following the radio call, the base station again transmits the taxi number and G138 is returned to normal flag-fall condition.

Further mechanical counters may be used as follows:
(a) Showing the number of flag-falls. Input information is direct from the flag key.
(b) Showing "unpaid units," such as travelling to pick up a radio fare. Input is from the output of the gate G142, but is gated "on" only when the flag key is "off." The counting circuit is therefore energised at all times, but oscillator 58 is turned off by gating G150 off.

Figure 8:
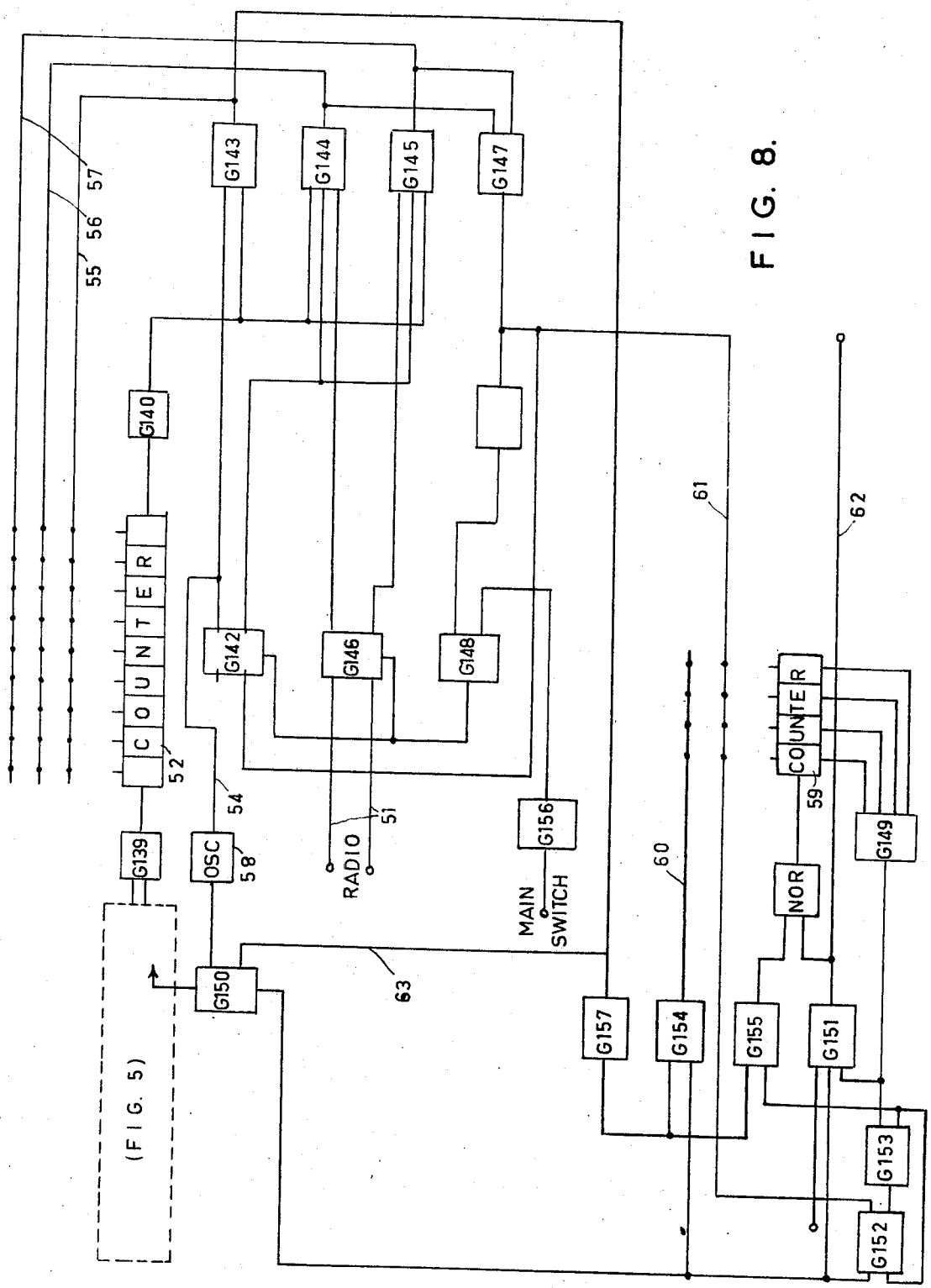
FIG. 8 shows an alternative circuit for recording charges.

FIG. 8 shows a block diagram of the general circuits for entering counts and charges from the outputs of the circuits of FIGS. 5 and 7.

The circuits of FIG. 5 are indicated in box form and the output of FIG. 7 is applied at terminals 51.

G139 combines "time" and "distance" pulses from the FIG. 5 arrangement and feeds them serially to a 9-stage binary counter 52. The maximum count of counter 52 is 512, but normally a pulse will be required through mono G140 (at its output) at a lesser count. The output pulse from G140 is fed through gate G143 to line 55 to set selected stages in the counter to a "subtraction" number before the next count is begun.

For example, if the counter is to count 400, the subtraction number will be 112 and the fifth, sixth and seventh stages will be activated ($2^6+2^5+2^4=112$).

The counter will therefore give an output each time on the 400th input pulse.

On switch-on the counter 52 may be at any value and must be cleared. Oscillator 58 has two operating speeds, a high speed (e.g. 1200 c.p.s.) for clearing the counter 52 and a lower speed for feeding counting pulses either to counter 52 or to a counter 59 (as will be later explained). Oscillator 58 is set to high speed by output lead 54 from a binary G142, counter 52 rapidly produces an output pulse on clearing which resets G142 (as explained below) and returns the oscillator 58 to slow speed.

At the same time G142 disables gate G143 and enables gates G144 and G145, outputs from either G144 or G145, when fed with the next counter output pulse, will depend on the condition of binary G146, controlled via leads 51 from the radio surcharge circuit, and of binary G142. G144 output enters a flag-fall charge and G145 a radio surcharge. NOR gate G147 resets G142 and G146.

Oscillator 58 (now being at slow speed), works the counter 52 up to full count again, the number of input pulses corresponding to the minimum distance value.

Since G142 is now reset, the next output pulse from G140 is gated through G143, output from which sets the "flag-fall" value into the counter 52.

In order that the "minimum-distance," "radio-surcharge" or "flag-fall" values may be entered in counter 52, leads 55, 56, 57 from G143, G144 and G145, are connected to appropriate stages of the counter in the manner explained in relatiton to lead 55 above.

Mono G156 is provided in the main switch lead to ensure (via gate G148) that binary G146 is not in the radio surcharge condition at switch-on.

The serial mode for clearing counter 52 described has the advantage that, if any element of the counter fails, it cannot be cleared and flag-fall cannot be entered. This gives a visual indication of a fault condition.

Counter 52 thus produces a single output pulse for every unit of time or distance plus an equivalent in flag-fall or radio surcharge.

While oscillator 58 is counting into counter 52, all time and distance pulses from the FIG. 5 arrangement are locked out. Oscillator 58 thus clears the counter at high speed and gives a first pulse, and then counts at lower speed to a minimum fare value to give a second output pulse. It is then locked out from the counter, and time or distance pulses applied to give a combined output as previously explained in relation to FIG. 5 or FIG. 1.

Each output pulse from counter 52 represents a certain monetary value (e.g. 5 cents) and pulses representing this fare value must be generated to feed the fare read-out (17 in FIG. 1). Furthermore, when a "minimum fare" applies, the first units of distance or time are included and so are not charged additionally.

These operations are performed by a four-binary counter 59 and associated circuitry, as will now be described.

Counter 59 pulse input is applied from oscillator 58, via a binary G150 (for squaring and 50% duty cycle adjustment) through a gate G151.

Control pulses are applied from G143 through G157 and G154 to line 60 and from G144 or G155 through gate G147 to line 61.

Counter 59 has each binary stage connected to a gate G149, which gives output only when all stages are at zero, that is, when the counter reads zero.

On switch-on, counter 59 may be non-zero. G149 opens gate G151, allowing pulses from oscillator 58 to step the counter until it reaches zero, and closes gate G155. G149 then changes over binary G152 via gate G153, closes G151, opens G155 and closes G154. The counter is therefore cleared.

The next pulse from G144 or G145 via G147 is applied to line 61 and to direct inputs of appropriate binary stages of counter 59 to set in a subtraction number corresponding to the uncharged "minimum distance" value.

This value is 16−x+1, the extra unit being added since an initial pulse from G143 will count "one" before any distance is travelled.

Now successive pulses from G143 enter the counter 59 via G157, G155 and eventually reach full count when the "minimum distance" allowance has been attained G147 resets G152 via gate G153, opens G151 and G154 and closes G155, G153.

The next pulse from G143 activates line 60, which sets the binary stages of counter 59 to a "subtraction" value giving a full count equal to the number of cents per pulse. Gate G151 being opened, the oscillator 58 runs counter 59 up to full count, the number of pulses being the fare in cents.

The output pulses from G151 are passed via lead 62 to the fare read-out and master counter (17 and 16, FIG. 1) through appropriate gates.

Binary G152, it will be noted, is locked by lead 63, so that it is no longer changed over by G149 on counter zero. Thus each successive pulse from G143 will enter the appropriate fare increment.

At the end of the trip a reset to G152 is operated by the flag switch to restore the system to ready condition.

Since the pulses from G143 are not synchronized with oscillator 58, it is possible to obtain a short spurious pulse (e.g. 10 ms.) at G151. To prevent this, the G143 pulse is applied via lead 63 to reset binary G150 and preserve the 50% duty cycle of pulses from oscillator 58.

Since the oscillator pulses are maintained at a comparatively low speed and at a duty cycle of 5% a mechanical counter may be conveniently used for the master counter, thus avoiding loss of reading on failure of supply voltage.

I claim:

1. A taximeter for reading a fare total including a distance charge and a waiting charge on a digital fare read-out, which is returned to zero at the end of each hire period characterized in that meter includes; first means including a sensor producing a first electrical pulse train, the number of pulses representing said distance charge in a certain proportion; second means including a constant-frequency oscillator producing a second pulse train; representing said waiting charge in the same proportion; counting means for counting the sum of pulses from said first and second pulse trains; means for operating said fare read-out from said counting means; and control means actuated by said first pulse train to prevent the application of said second pulse train to said counting means.

2. A taximeter as claimed in claim 1, characterized in that said sensor includes a shaft rotatable by the speedometer cable of said taxi, a magnetic armature on said shaft, and a reed relay adjacent said shaft.

3. A taximeter as claimed in claim 1, characterized by the inclusion of a master-counter which sums the input to said counting means over more than one hire period.

4. A taximeter as claimed in claim 1, including also flag-call charging means, characterized in that operation of a flag-fall switch controls said counting means to add thereto pulses representing flag-call charge.

5. A taximeter as claimed in claim 4, characterized in that said counting means comprises a multistage binary counter and said pulses are added by direct entry into the stages of said counting means, setting therein a "subtraction" number equivalent to the flag-call fare.

6. A taximeter as claimed in claim 1, in which said taxi has a two-way radio system, characterized in that it includes first selecting means responsive to an "accept" signal from the taxi receiver feeding a storage means for storing a radio-charge signal; second selecting means responsive to a "cancel" signal from said receiver cancelling said stored signal; and transfer means actuated on change of said taximeter to "hire" condition to pass said stored signal to record a radio charge fare on said digital readout.

7. A taximeter as claimed in claim 6, characterized in that said first and second selecting means include a digital selector responsive to the fleet number of the taxi.

8. A taximeter as claimed in claim 6, characterized in that first and second selecting means each include a bandpass filter and said storage means includes a flip-flop circuits the two inputs of which are fed from said bandpass filters.

9. A taximeter as claimed in claim 5, in which said flag-call charge includes a minimum initial distance, characterized in that on flag-fall, pulses corresponding to said minimum distance are prevented from reaching said fare readout by gating means.

10. A taximeter as claimed in claim 1, characterized by a distance error-correction circuit, said circuit including; a pulse divider to provide an output pulse at the end of each preselected unit of distance travelled; and means responsive to each said pulse to subtract from said first pulse train the number of pulses corresponding to said distance error.

11. A taximeter as claimed in claim 1, in which waiting charge applies below a certain minimum speed of travel characterized in that said control means includes a control oscillator producing pulses corresponding to said minimum speed, a reset to said control oscillator responsive to said first pulse train from said sensor to prevent output from said control oscillator above said minimum speed, and gating means to prevent application of said second pulse train to said counting means only above said minimum speed, and prevent application of said first pulse train to said counting means below said minimum speed.

12. In a taximeter as claimed in claim 1, said sensor including; a body; a shaft rotatable in said body; a magnetic armature on said shaft; a reed relay adjacent said armature; and means to couple said shaft for rotation by a driving cable of the speedometer of the taxi.

13. In a taximeter as claimed in claim 1, the taxi being provided with two-way radio; a radio-call charging system including; first selecting means fed from the taxi receiver with a radio call "accept" signal; second selecting means fed from said receiver with a radio call "cancel" signal; storage means actuated by said first selecting means to store a signal representing the radio call charge; cancelling means fed from said second selecting means for cancelling said stored signal; and transfer means actuated on change of said meter to "hire" condition to enter a radio call charge in said fare readout from said storage means.

14. A radio call charging system as claimed in claim 13, in which said first and second selecting means include a digital counter responsive to received pulses corresponding to the taxi's fleet number.

15. A radio call charging system as claimed in claim 13, in which said storage means includes means for entering a "subtraction" number in selected stages of the counting means of the meter, the substraction number being equivalent to the radio call charge.

16. In a taximeter as claimed in claim 1, a distance error-correction circuit including; a pulse divider fed by distance pulses and producing an output pulse at the end of each preselected unit distance travelled; and means responsive to each said output pulse to subtract from said first pulse train the number of pulses corresponding to said distance error.

References Cited

UNITED STATES PATENTS

| | | | |
|---|---|---|---|
| 3,157,352 | 11/1964 | Caywood | 235—30 |
| 3,254,833 | 6/1966 | Condy et al. | 235—30 |
| 3,388,859 | 6/1968 | Kelch et al. | 235—30 |

STEPHEN J. TOMSKY, Primary Examiner